US006076701A

United States Patent [19]

Jung

[11] Patent Number: 6,076,701

[45] Date of Patent: Jun. 20, 2000

[54] AUTOMATIC VENDING MACHINE

[75] Inventor: Il-Du Jung, Kwangju, Rep. of Korea

[73] Assignee: Kwangju Electronics Co., Ltd., Kwangju, Rep. of Korea

[21] Appl. No.: 09/065,860

[22] Filed: Apr. 24, 1998

[30] Foreign Application Priority Data

May 1, 1997 [KR] Rep. of Korea .................... 97-9733 U

[51] Int. Cl.[7] ...................................................... B65G 59/00

[52] U.S. Cl. ............................................. 221/247; 221/248

[58] Field of Search .................................... 221/9, 15, 13, 221/2, 3, 247, 248, 250, 191, 193

[56] References Cited

U.S. PATENT DOCUMENTS 3,080,036 3/1963 Robbins et al. ........................ 221/248
4,655,368 4/1987 Bateman et al. ............................ 221/4

*Primary Examiner*—Kenneth W. Noland

*Attorney, Agent, or Firm*—Perman & Green, LLP

[57] ABSTRACT

In order to get a bill conveniently inserted only by using one hand of a customer as a bill input inlet door is kept open for a predetermined time duration and to fall down by its weight, there is provided an automatic vending machine having a bill input inlet disposed at a predetermined position of the front cabinet, a bill discriminating apparatus embedded inside of the front cabinet at a same height level for discriminating the authenticity of a bill induced through the bill input inlet and for storing the bill and a movable bill input inlet door hinged at the upper side of the bill input inlet for opening and closing the bill input inlet, wherein the bill input inlet is constructed of an opening and closing structure where, after a bill input inlet door is pushed up to a door inducing member and released, a bill input inlet door is slided by a soft contact at an initial closing phase thereof, is moved loosely but swiftly at a middle closing phase thereof and is slidingly contacted at a final closing phase thereof to be finally closed.

3 Claims, 1 Drawing Sheet

EXHIBIT A

AUTOMATIC VENDING MACHINE

BACKGROUND OF THE INVENTION

1. Field of the Invention

The present invention relates to an automatic vending machine to get a bill conveniently inserted only by using one hand of a customer as a bill input inlet door is kept open for a predetermined time duration and to fall down after the consumer pushes up a bill input inlet door, thereby providing a bill input inlet for a convenient use.

2. Description of the Prior Art

In general, an opening and closing structure of a bill input inlet of an automatic canned product vending machine, as shown in FIG. 1, comprises a bill input inlet (11) disposed at a predetermined position of the front cabinet (10), a bill discriminating apparatus (30) embedded inside of the front cabinet (10) at a same height level for discriminating the authenticity of a bill induced through the bill input inlet (11) and for storing the bill and a movable bill input inlet door (20) hinged at the upper side of the bill input inlet (11) for opening and closing the bill input inlet (11).

The bill discriminating apparatus (30) includes a bill guiding groove (31) disposed at an identical height with the bill input inlet (11) for getting a bill (a) conveniently drawn-in, and a bill inducing inlet (32) connected to a bill guiding area (31) for getting a bill (a) rolled in.

Therefore, in order to get the bill to be input through the bill inducing inlet (32) of the bill discriminating apparatus (30), the bill is flattened and drawn into the bill inducing inlet (32) through the bill guiding area (31) after the bill input inlet door (20) is swung up and opened.

However, in case one hand of a customer is occupied with an umbrella or other parcels, it is difficult to flatten a bill and to insert a bill through the bill input inlet (11) and the bill guiding area (31) to the bill inducing inlet (32) with the bill input inlet door (20) lifted open.

SUMMARY OF THE INVENTION

The present invention is presented to solve the aforementioned problems and it is an object of the present invention to provide an opening and closing structure of a bill input inlet of an automatic vending machine where, after a bill input inlet door is lifted up to a door inducing member and released, a bill input inlet door is slided by a soft contact at an initial closing phase thereof, is moved loosely but swiftly at a middle closing phase thereof and is slidingly contacted at a final closing phase thereof, thereby getting a bill conveniently inserted only by using one hand of a customer as a bill input inlet door is kept open for a predetermined time duration and to fall down by its weight.

In order to achieve the object of the present invention, there is provided an automatic vending machine having a bill input inlet disposed at a predetermined position of the front cabinet, a bill discriminating apparatus embedded inside of the front cabinet at an identical height level to the bill input inlet for discriminating the authenticity of a bill induced through the bill input inlet and for storing the bill and a movable bill input inlet door hinged at the upper side of the bill input inlet for opening and closing the bill input inlet, wherein the bill input inlet is constructed of an opening and closing structure where, after a bill input inlet door is pushed up to a door inducing member and released, a bill input inlet door is slided by a soft contact at an initial closing phase thereof, is moved loosely but swiftly at a middle closing phase thereof and is slidingly contacted at a final closing phase thereof to be finally closed.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
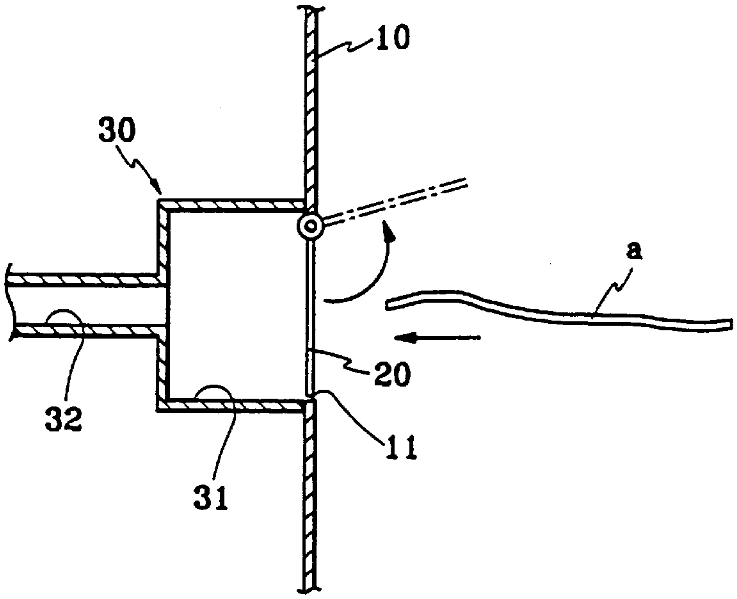
FIG. 1 is a brief sectional view for illustrating an opening and closing structure of a bill input inlet of a conventional automatic vending machine.
Figure 2:
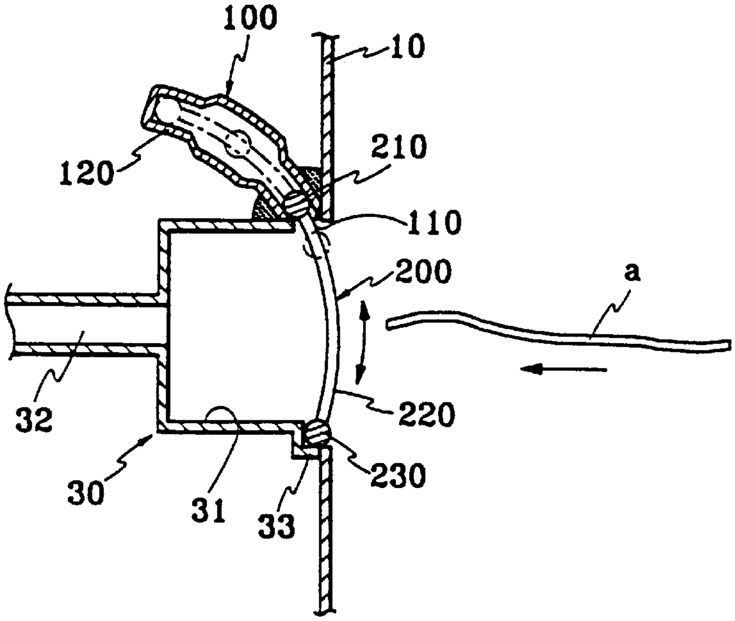
FIG. 2 is a brief sectional view for illustrating an opening and closing structure of a bill input inlet of an automatic vending machine in accordance with the present invention.

An embodiment of the present invention is described in detail with reference to the accompanying drawings. In FIG. 2, like reference numerals and symbols are used for designation of like or equivalent parts or portions in FIG. 1 for simplicity of illustration and explanation, and redundant references will be omitted.

The opening and closing structure of a bill input inlet of an automatic canned product vending machine in accordance with the present invention, comprises a bill input inlet (11) disposed at a predetermined position of the front cabinet (10), a bill discriminating apparatus (30) embedded inside of the front cabinet (10) at a same height level to the bill input inlet (11) for discriminating the authenticity of a bill induced through the bill input inlet (11) and for storing the bill and a movable bill input inlet door (200) hinged at the upper side of the bill input inlet (11) for opening and closing the bill input inlet (11), wherein the bill input inlet is constructed of an opening and closing structure where, after a bill input inlet door (200) is pushed up to a door inducing member (100) and released, a bill input inlet door is slided by a soft contact at an initial closing phase thereof, is moved loosely but swiftly at a middle closing phase thereof and is slidingly contacted at a final closing phase thereof to be finally closed.

The door inducing member (100) comprises a door inducing inlet (110) formed with the end thereof attached to the upper side of the bill input inlet door being connected open to the front; and a sliding control part (120) to be the bill input inlet door (200) slided by a soft contact at an initial closing phase thereof, moved loosely but swiftly at a middle closing phase thereof and slidingly contacted at a final closing phase thereof to finally close the bill input inlet door, after a control member (210) of the bill input inlet door is lifted up to the door inducing member (100) and released.

The bill input inlet door (200) comprises the control member (210) made of a material of high coefficient of friction sliding to the door inducing inlet (110) and moving to the sliding control part (120), a plastic door plate (220) attached at the lower part of the control member (210) being and a door weight control portion (230) attached at a plastic door plate along to the end of the door plate (220) for controlling the weight of the door and for being placed at an accommodating portion (33) formed in front of the bill guiding area (31) of the bill discriminating apparatus (30).

Next, operational effect of the present invention is described in detail. In order to insert the bill (a) into the bill inducing inlet (32) of the bill discriminating apparatus (30), the bill input inlet door (200) is lifted up open, a bill is flattened to be inserted before the bill input inlet door (200) drops by its weight, thereby making it convenient to insert the bill (a) into the bill input inlet (11) by using only one hand.

After the control part (210) of the bill input inlet door (200) is lifted up and released, the bill input inlet door (200) is slided by a soft contact at an initial closing phase thereof, is moved loosely but swiftly at a middle closing phase thereof and is slidingly contacted at a final closing phase thereof to be finally closed, whereby a time duration to insert the bill (a) is allowed.

As apparent from the foregoing, there is an advantage in the bill input inlet of an automatic vending machine in that it is constructed with an opening and closing structure where, after the bill input inlet door is pushed up to the door inducing member and released, a bill input inlet door is slided by a soft contact at an initial closing phase thereof, is moved loosely but swiftly at a middle closing phase thereof and is slidingly contacted at a final closing phase thereof, thereby getting a bill conveniently inserted only by using one hand of a customer as a bill input inlet door is kept open for a predetermined time duration and to fall down by its weight.

Even if the embodiment of the present invention is described here, the actual scope of the present invention is not limited in the present embodiment. It is believed evident that many variations can be made by those skilled in the art without departing from the spirit and scope of this invention.

What is claimed is:

1. An automatic vending machine having a bill input inlet disposed at a predetermined position of the front cabinet, a bill discriminating apparatus embedded inside of the front cabinet at an identical height level to the bill input inlet for discriminating the authenticity of a bill induced through the bill input inlet and for storing the bill and a movable bill input inlet door hinged at the upper side of the bill input inlet for opening and closing the bill input inlet door, wherein the bill input inlet is constructed of an opening and closing structure where, after a bill input inlet door is lifted up to a door inducing member and released, a bill input inlet door is slided by a soft contact at an initial closing phase thereof, is moved loosely but swiftly at a middle closing phase thereof and is slidingly contacted at a final closing phase thereof to be finally closed.

2. The machine, as defined in claim 1, wherein the door inducing member comprises:

a door inducing inlet formed with the end thereof attached to the upper side of the bill input inlet being connected open to the front; and a sliding control part to be the bill input inlet door slided by a soft contact at an initial closing phase thereof, moved loosely but swiftly at a middle closing phase thereof and slidingly contacted at a final closing phase thereof after a control member of the bill input inlet door is lifted up to a door inducing member and released.

3. The machine, as defined in claim 1, the bill input inlet door comprises:

a control member made of a material of high coefficient of friction sliding to the door inducing inlet and moving to the sliding control part;

a plastic door plate attached at the lower part of the control member being; and a door weight control portion attached at a plastic door plate along o the end of the door plate for controlling the weight of the door and for being placed at an accommodating portion formed in front of the bill guiding area of the bill discriminating apparatus.

* * * * *